United States Patent [19]

Walther

[11] 4,195,050

[45] Mar. 25, 1980

[54] METHOD FOR MAKING A FILTER

[76] Inventor: Peter A. Walther, am Neuschacht 44, Grünbach, Austria, 2733

[21] Appl. No.: 946,946

[22] Filed: Sep. 29, 1978

[30] Foreign Application Priority Data

Oct. 17, 1977 [AT] Austria .................................. 7402/77

[51] Int. Cl.² ....................... B29C 17/08; B29C 25/00
[52] U.S. Cl. .................................. 264/137; 264/46.6; 264/138; 264/255; 264/261; 264/263
[58] Field of Search ................. 210/484, 500 R, 505, 210/506, 508, 323 T, 261, 263, 271, 255; 264/138, 137, 261, 263, 267, 466

[56] References Cited

U.S. PATENT DOCUMENTS

| | | | |
|---|---|---|---|
| 1,815,721 | 7/1931 | McGraw | 264/277 |
| 3,255,280 | 6/1966 | Burrowes | 264/277 |
| 3,442,002 | 5/1969 | Geary et al. | 264/298 |
| 3,525,786 | 8/1970 | Meyn | 264/277 |
| 3,579,810 | 5/1971 | Mon | 264/277 |
| 4,105,731 | 8/1978 | Yamazaki | 264/261 |

*Primary Examiner*—W. E. Hoag
*Attorney, Agent, or Firm*—John J. Dennemeyer

[57] ABSTRACT

Method for making a filter which comprises a plurality of closely juxtaposed tubes made of a filter material and packed tightly in a tubular envelope. Both ends of the tubes are initially closed. The envelope with the tubes is then dipped to a small depth into a hardenable substance, e.g. latex, which fills the gaps between the tubes and on hardening forms a solid bottom on the envelope. A small length of the envelope and tubes is then severed to open one end of the tubes.

6 Claims, 7 Drawing Figures

METHOD FOR MAKING A FILTER

BACKGROUND OF THE INVENTION

The invention relates to a filter which has a substantially larger specific filter area than filters known hitherto, as well as to a process for the manufacture thereof.

SUMMARY OF THE INVENTION

According to the invention the filter consists basically of a tubular outer envelope or frame sealed at one of its ends by a bottom made of a thermo-plastic substance, e.g. a resin, wherein small filter tubes made for example of filter paper, glass wool or the like sealed at one of their ends but open at their other ends are embedded into the bottom of the frame. The small filter tubes are preferably arranged in rows in such way that there is a gap between the rows. By filling the small filter tubes with polyurethane foam, the filter can be permeated by the fluid medium to be filtered from two opposite directions.

According to the invention, the process for the manufacture of the filter is characterized in that a plurality of small filter tubes, preferably in contact with one another and made for example of filter papers of different porosity, are placed in a hollow envelope or frame, the two ends of the tubes being closed, whereafter the frame together with the small filter tubes is immersed at one of its ends into a substance that hardens for example on curing, e.g. a resin, to a depth sufficient only for the resin to fix only the ends of the small tubes to one another, while at the same time forming a floor or bottom on the envelope or frame, whereby to seal off not only the gaps between the individual small tubes, but also the gaps between the envelope or frame and the small tubes. As a next step the resin layer, together with the ends of the small tubes is separated for example by grinding to the extent that the ends of the small tubes embedded in the resin layer are opened.

In order to increase the efficiency of the filter, e.g. by increasing the net filter area, according to the invention distance-holding or spacer strips of paper may be placed between the individual positions of the small filter tubes, which can be separated from the bottom after curing or hardening, e.g. by tearing off.

The filter according to the invention may be formed with any desired cross-sectional shape, e.g. it can be rectangular, oval or circular. The small paper tubes employed have a preferred diameter of 5–7 mm but, depending on the manufacture, may also have larger diameters. In a preferred embodiment of the invention approximately 13530 small tubes can be placed into a rectangular tubular frame with a cross-sectional area of 610×610 mm. This represents a filter area of approximately 31 m$^2$.

BRIEF DESCRIPTION OF THE DRAWING

The invention is explained merely by way of example of a preferred embodiment illustrated in the accompanying drawing, wherein.

DESCRIPTION OF THE PREFERRED EMBODIMENT

Figure 1:
FIG. 1 illustrates a small filter tube used in the manufacture of a filter according to the invention.
Figure 2:
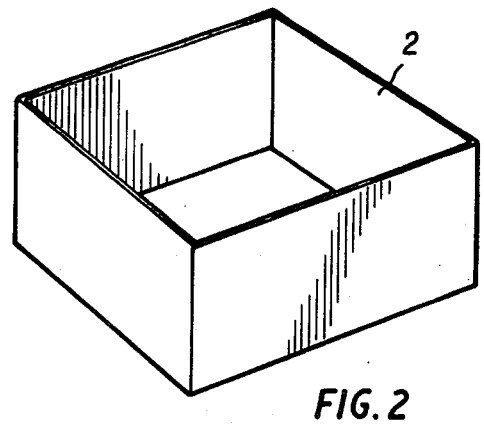
FIG. 2 shows a frame or an envelope for the filter to be manufactured.
Figure 3:
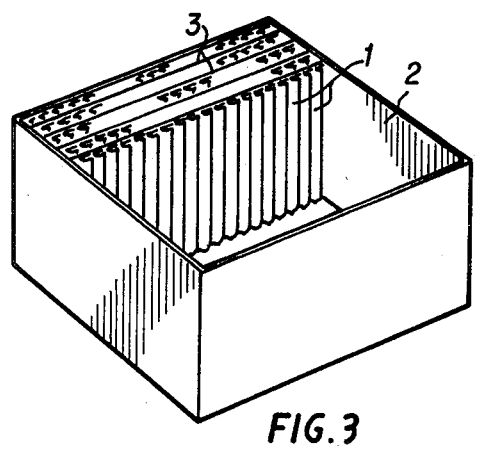
FIG. 3 illustrates the placing of the small filter tubes in the frame or envelope.
Figure 4:
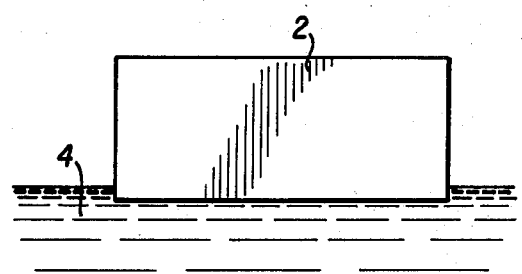
FIG. 4 illustrates the immersion of the frame or envelope filled with small filter tubes into a suitable resin bath.

Referring to the drawing, small filter tubes 1 made for example of filter paper, but alternatively of glass fibre material, are placed or shaken into a state where they are mutually aligned in parallel and both their ends are sealed into an envelope or frame member 2. This can be done, as shown in FIG. 3, in rows mutually spaced by paper strips acting as spacers, with the aid of a feeding air stream (not indicated) in such a way that the individual small filter tubes stand up straight. The basic envelope or frame 2 filled with the smaller filter tubes is then dipped into a liquid epoxy resin mass or bath 4 down to a depth of approximately 20 mm. The hardened epoxy-resin bonds not only the individual small filter tubes together with the spacing papers, but at the same time also forms a solid bottom to the envelope or frame 2 which makes it possible in the completed filter to separate the raw gas space from the pure gas space.

Figure 5:
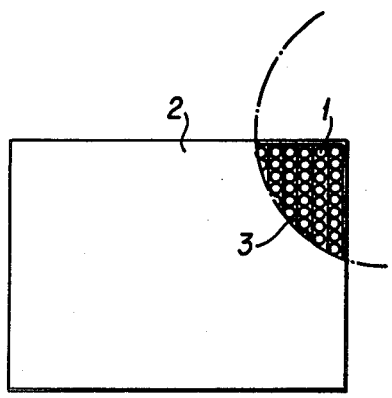
FIG. 5 shows diagrammatically the grinding off and opening of the small filter tubes.
Figure 6:
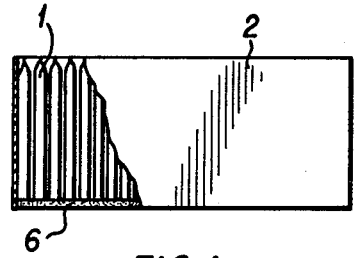
FIG. 6 diagrammatically illustrates a completed filter in cross-section; and finally
Figure 7:
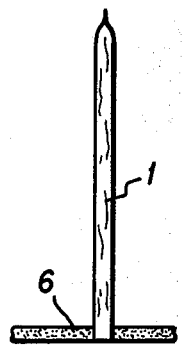
FIG. 7 shows an individual small filter tube of the completed filter on a larger scale.

One part of the hardened resin bottom with the embedded small filter tubes is subsequently separated for example by means of a grinding machine (FIG. 5). Accordingly, the completed filter consists of an external envelope 2 (frame), the small filter tubes 1 and a resin bottom 6. The spacer strips 3, which are perforated in the vicinity of the resin bottom 6, are removed.

Now the small filter tubes are open at one end and can be filled with polyurethane foam. This makes it possible for the medium to be filtered to permeate the filter in two opposite directions and thus to increase the utility of the filter.

According to another example of the process the instructions given below may be followed:

5000 small filter tubes, closed at both ends, with a length of 300 mm, a diameter of 5 mm and a wall thickness of 0.01 mm, made of filter paper with a permeability to air of 170 ml per cm$^2$ per minute at 10 mm water head were placed closely juxtaposed and in contact with one another, into a rectangular envelope made of waxed two-layer corrugated paper. The envelope was 500 mm long, 250 mm wide and 300 mm high. The envelope together with its contents was immersed to a depth of 30 mm into liquid latex (rubber milk) at room temperature in such a way that the latex was wetting all the individual small filter tubes. After removal from the bath, the surplus latex that keeps the gaps between the small filter tubes closed was drained by dripping. Subsequently, a liquid 2-component epoxy resin mass in a layer thickness of about 30 mm was applied with a spatula to the ends of the small filter tubes wetted by latex. After hardening of the resin mass, an approximately 20 mm length of the envelope together with the small filter tubes embedded in the epoxy resin mass was cut by a band saw on a cutting table, whereby to obtain filter tubes fixed in the envelope and open at one end while still closed at their other end. The envelope with an effective filter area of 22 m$^2$ was then mounted in a casing, presenting a finished, ready-to-use filter insert.

What is claimed is:

1. A process for making a filter comprising placing in a hollow tubular envelope a plurality of small filter tubes closed at both of their ends, immersing the envelope together with the small filter tubes into a hardenable substance to a depth such that the said substance bonds one of the ends only of each of the small tubes and at the same time forms a bottom member on the envelope so as to close the gaps between the individual small tubes as well as the gaps between the envelope and the small tubes, and removing an amount of the layer of the hardenable substance together with the end of the small tubes, said immersing being to a depth of 30 mm into latex and such that the individual small filter tubes are wetted by the latex and the gaps between the small filter tubes are sealed, whereafter the surplus latex mass is allowed to drain, applying epoxy resin to said latex on said tubes then cutting the resin and latex layers and the ends of the small tubes from the envelope so that the ends of the small tubes embedded in latex or resin are opened, said epoxy, thereby forming a tube-sheet for said tubes and sheet for said tubes and said envelope.

2. A process according to claim 1 wherein the small tubes are in contact and in parallel alignment with one another when placed into the envelope.

3. A process according to claim 1 wherein the small tubes are made of filter papers of different porosity.

4. A process according to claim 1 wherein said substance is a thermosetting resin.

5. A process according to claim 1 wherein distance-holding spacer strips of paper are placed between the individual positions of the small filter tubes and are separated from the bottom of the envelope after hardening of the said substance.

6. A process for the manufacture of a filter comprising placing in a hollow tubular envelope a plurality of small filter tubes closed at both of their ends, immersing the envelope together with the small filter tubes into a hardenable substance to a depth such that the said substance bonds one of the ends only of each of the small tubes and at the same time forms a bottom member on the envelope so as to close the gaps between the individual small tubes as well as the gaps between the envelope and the small tubes, and removing an amount of the layer of the hardenable substance together with the end of the small tubes and filling each of said small filter tubes with open celled polymer foam.

* * * * *